United States Patent [19]
Matthews et al.

[11] Patent Number: 5,793,362
[45] Date of Patent: Aug. 11, 1998

[54] CONFIGURATIONS TRACKING SYSTEM USING TRANSITION MANAGER TO EVALUATE VOTES TO DETERMINE POSSIBLE CONNECTIONS BETWEEN PORTS IN A COMMUNICATIONS NETWORK IN ACCORDANCE WITH TRANSITION TABLES

[75] Inventors: Wallace Matthews, Northwood; Vick Vaishnavi, Danvil, both of N.H.

[73] Assignee: Cabletron Systems, Inc., Rochester, N.H.

[21] Appl. No.: 566,978

[22] Filed: Dec. 4, 1995

[51] Int. Cl.$^6$ ............................................. G06F 13/00
[52] U.S. Cl. ............................ 395/200.54; 395/200.53
[58] Field of Search ..................... 395/200.54, 200.72, 395/200.53; 379/220; 340/825.06; 370/255; 345/349; 707/266

[56] References Cited

U.S. PATENT DOCUMENTS

| | | | |
|---|---|---|---|
| 4,513,411 | 4/1985 | Fraser | 370/13 |
| 4,817,080 | 3/1989 | Soha | 370/17 |
| 4,827,411 | 5/1989 | Arrowood et al. | 707/206 |
| 4,943,998 | 7/1990 | Bauer | 379/220 |
| 5,049,873 | 9/1991 | Robins et al. | 340/825.06 |
| 5,051,987 | 9/1991 | Conlon | 370/255 |
| 5,101,348 | 3/1992 | Arrowood et al. | 395/200.72 |
| 5,136,690 | 8/1992 | Becker et al. | 345/349 |
| 5,319,633 | 6/1994 | Gever et al. | 370/17 |
| 5,471,399 | 11/1995 | Tanaka et al. | 370/13 |
| 5,481,674 | 1/1996 | Mahavadi | 395/200.11 |
| 5,513,171 | 4/1996 | Ludwiczak et al. | 370/13 |
| 5,606,664 | 2/1997 | Brown et al. | 395/200.54 |

*Primary Examiner*—Frank J. Asta
*Assistant Examiner*—Le Hien Luu
*Attorney, Agent, or Firm*—Wolf, Greenfield & Sacks, P.C.

[57] ABSTRACT

A network is monitored for reports indicative of a connection state among ports of a communications network. Certain ports are designated as being in a transition, and a transition table is created for each transition. The transition table includes locations that directly relate the connectivity of a first port with respect to a second port, as well as locations that relate the connectivity of other ports. The contents of the transition table are evaluated to determine the likely configuration of the communications network. State machines may be used to resolve conflicting data within the transition table, by providing a likely connection output based upon different entries within the transition table. A voting scheme is used to evaluate the outputs of the state machines and update the transition table when appropriate, and the updated transition table may also be evaluated.

29 Claims, 16 Drawing Sheets

NEIGHBOR PORTS

|   | A | B | C | D | E | F |   |
|---|---|---|---|---|---|---|---|
| A | – | 1 | 0 | 0 | 0 | 0 | ~321 |
| B | 1 | – | 0 | 0 | 0 | 0 | ~322 |
| C | 0 | 0 | – | 1 | 0 | 0 | ~323 |
| D | 0 | 0 | 1 | – | 0 | 0 | ~324 |
| E | 0 | 0 | 0 | 0 | – | 0 | ~325 |
| F | 0 | 0 | 0 | 0 | 0 | – | ~326 |

REPORTING PORTS

X.PORTS = [A,B]

Y.PORTS = [C,D]

| ENTRY IN LOCATION "X-Y" (OR "Y-X") | ENTRY IN LOCATION "Y-X" (OR "X-Y") | X-Y CONNECTION RESULT (2 VOTES) |
|---|---|---|
| CONFIRMED NOT CONNECTED (0) | CONFIRMED NOT CONNECTED (0) | CONFIRMED NOT CONNECTED (0) |
| CONFIRMED NOT CONNECTED (0) | CONFIRMED CONNECTED (1) | UNDETERMINED (4) |
| CONFIRMED NOT CONNECTED (0) | CAPTURE CONNECTED (2) | CONFIRMED CONNECTED (1) |
| CONFIRMED NOT CONNECTED (0) | ASSUMED NOT CONNECTED (3) | CONFIRMED NOT CONNECTED (0) |
| CONFIRMED NOT CONNECTED (0) | UNDETERMINED (4) | CONFIRMED NOT CONNECTED (0) |
| CONFIRMED NOT CONNECTED (0) | CAPTURE NOT CONNECTED (5) | CONFIRMED NOT CONNECTED (0) |
| CONFIRMED NOT CONNECTED (0) | ASSUMED CONNECTED (6) | CONFIRMED NOT CONNECTED (0) |
| CONFIRMED CONNECTED (1) | CONFIRMED CONNECTED (1) | CONFIRMED CONNECTED (1) |
| CONFIRMED CONNECTED (1) | CAPTURE CONNECTED (2) | CONFIRMED CONNECTED (1) |
| CONFIRMED CONNECTED (1) | ASSUMED NOT CONNECTED (3) | CONFIRMED CONNECTED (1) |
| CONFIRMED CONNECTED (1) | UNDETERMINED (4) | CONFIRMED CONNECTED (1) |
| CONFIRMED CONNECTED (1) | CAPTURE NOT CONNECTED (5) | CONFIRMED CONNECTED (1) |
| CONFIRMED CONNECTED (1) | ASSUMED CONNECTED (6) | CONFIRMED CONNECTED (1) |
| CAPTURE CONNECTED (2) | CAPTURE CONNECTED (2) | CONFIRMED CONNECTED (1) |
| CAPTURE CONNECTED (2) | ASSUMED NOT CONNECTED (3) | UNDETERMINED (4) |
| CAPTURE CONNECTED (2) | UNDETERMINED (4) | CONFIRMED CONNECTED (1) |
| CAPTURE CONNECTED (2) | ASSUMED CONNECTED (6) | CONFIRMED CONNECTED (1) |
| ASSUMED NOT CONNECTED (3) | ASSUMED NOT CONNECTED (3) | CONFIRMED NOT CONNECTED (0) |
| ASSUMED NOT CONNECTED (3) | UNDETERMINED (4) | CONFIRMED NOT CONNECTED (0) |
| ASSUMED NOT CONNECTED (3) | CAPTURE NOT CONNECTED (5) | CONFIRMED NOT CONNECTED (0) |
| ASSUMED NOT CONNECTED (3) | ASSUMED CONNECTED (6) | UNDETERMINED (4) |
| UNDETERMINED (4) | UNDETERMINED (4) | UNDETERMINED (4) |
| UNDETERMINED (4) | CAPTURE NOT CONNECTED (5) | CONFIRMED NOT CONNECTED (0) |
| CAPTURE NOT CONNECTED (5) | CAPTURE NOT CONNECTED (5) | CONFIRMED NOT CONNECTED (0) |
| CAPTURE NOT CONNECTED (5) | ASSUMED CONNECTED (6) | UNDETERMINED (4) |
| ASSUMED CONNECTED (6) | ASSUMED CONNECTED (6) | CONFIRMED CONNECTED (1) |

FIG. 12

| ENTRY IN LOCATION "Z-X" | ENTRY IN LOCATION "Z-Y" | X-Y CONNECTION RESULT (1 VOTE) |
|---|---|---|
| CONFIRMED NOT CONNECTED (0) | CONFIRMED NOT CONNECTED (0) | CONFIRMED CONNECTED (1) |
| CONFIRMED NOT CONNECTED (0) | CONFIRMED CONNECTED (1) | CONFIRMED NOT CONNECTED (0) |
| CONFIRMED NOT CONNECTED (0) | CAPTURE CONNECTED (2) | CONFIRMED NOT CONNECTED (0) |
| CONFIRMED NOT CONNECTED (0) | ASSUMED NOT CONNECTED (3) | CONFIRMED CONNECTED (1) |
| CONFIRMED NOT CONNECTED (0) | UNDETERMINED (4) | UNDETERMINED (4) |
| CONFIRMED NOT CONNECTED (0) | CAPTURE NOT CONNECTED (5) | CONFIRMED CONNECTED (1) |
| CONFIRMED NOT CONNECTED (0) | ASSUMED CONNECTED (6) | CONFIRMED NOT CONNECTED (0) |
| CONFIRMED CONNECTED (1) | CONFIRMED CONNECTED (1) | CONFIRMED CONNECTED (1) |
| CONFIRMED CONNECTED (1) | CAPTURE CONNECTED (2) | CONFIRMED CONNECTED (1) |
| CONFIRMED CONNECTED (1) | ASSUMED NOT CONNECTED (3) | CONFIRMED NOT CONNECTED (0) |
| CONFIRMED CONNECTED (1) | UNDETERMINED (4) | UNDETERMINED (4) |
| CONFIRMED CONNECTED (1) | CAPTURE NOT CONNECTED (5) | CONFIRMED NOT CONNECTED (0) |
| CONFIRMED CONNECTED (1) | ASSUMED CONNECTED (6) | CONFIRMED CONNECTED (1) |
| CAPTURE CONNECTED (2) | CAPTURE CONNECTED (2) | CONFIRMED CONNECTED (1) |
| CAPTURE CONNECTED (2) | ASSUMED NOT CONNECTED (3) | CONFIRMED NOT CONNECTED (0) |
| CAPTURE CONNECTED (2) | UNDETERMINED (4) | UNDETERMINED (4) |
| CAPTURE CONNECTED (2) | CAPTURE NOT CONNECTED (5) | CONFIRMED NOT CONNECTED (0) |
| CAPTURE CONNECTED (2) | ASSUMED CONNECTED (6) | CONFIRMED CONNECTED (1) |
| ASSUMED NOT CONNECTED (3) | ASSUMED NOT CONNECTED (3) | CONFIRMED CONNECTED (1) |
| ASSUMED NOT CONNECTED (3) | UNDETERMINED (4) | UNDETERMINED (4) |
| ASSUMED NOT CONNECTED (3) | CAPTURE NOT CONNECTED (5) | CONFIRMED CONNECTED (1) |
| ASSUMED NOT CONNECTED (3) | ASSUMED CONNECTED (6) | CONFIRMED NOT CONNECTED (0) |
| UNDETERMINED (4) | UNDETERMINED (4) | UNDETERMINED (4) |
| UNDETERMINED (4) | CAPTURE NOT CONNECTED (5) | UNDETERMINED (4) |
| UNDETERMINED (4) | ASSUMED CONNECTED (6) | UNDETERMINED (4) |
| CAPTURE NOT CONNECTED (5) | CAPTURE NOT CONNECTED (5) | CONFIRMED CONNECTED (1) |
| CAPTURE NOT CONNECTED (5) | ASSUMED CONNECTED (6) | CONFIRMED NOT CONNECTED (0) |
| ASSUMED CONNECTED (6) | ASSUMED CONNECTED (6) | CONFIRMED CONNECTED (1) |

FIG. 13

| ENTRY IN LOCATION "Z-X" | ENTRY IN LOCATION "Z-Y" | X-Y CONNECTION RESULT (1 VOTE) |
|---|---|---|
| CONFIRMED NOT CONNECTED (0) | CONFIRMED NOT CONNECTED (0) | UNDETERMINED (4) |
| CONFIRMED NOT CONNECTED (0) | CONFIRMED CONNECTED (1) | CONFIRMED NOT CONNECTED (0) |
| CONFIRMED NOT CONNECTED (0) | CAPTURE CONNECTED (2) | CONFIRMED NOT CONNECTED (0) |
| CONFIRMED NOT CONNECTED (0) | ASSUMED NOT CONNECTED (3) | UNDETERMINED (4) |
| CONFIRMED NOT CONNECTED (0) | UNDETERMINED (4) | UNDETERMINED (4) |
| CONFIRMED NOT CONNECTED (0) | CAPTURE NOT CONNECTED (5) | UNDETERMINED (4) |
| CONFIRMED NOT CONNECTED (0) | ASSUMED CONNECTED (6) | CONFIRMED NOT CONNECTED (0) |
| CONFIRMED CONNECTED (1) | CONFIRMED CONNECTED (1) | CONFIRMED CONNECTED (1) |
| CONFIRMED CONNECTED (1) | CAPTURE CONNECTED (2) | CONFIRMED CONNECTED (1) |
| CONFIRMED CONNECTED (1) | ASSUMED NOT CONNECTED (3) | CONFIRMED NOT CONNECTED (0) |
| CONFIRMED CONNECTED (1) | UNDETERMINED (4) | UNDETERMINED (4) |
| CONFIRMED CONNECTED (1) | CAPTURE NOT CONNECTED (5) | CONFIRMED NOT CONNECTED (0) |
| CAPTURE CONNECTED (2) | ASSUMED CONNECTED (6) | CONFIRMED CONNECTED (1) |
| CAPTURE CONNECTED (2) | CAPTURE CONNECTED (2) | CONFIRMED CONNECTED (1) |
| CAPTURE CONNECTED (2) | ASSUMED NOT CONNECTED (3) | CONFIRMED NOT CONNECTED (0) |
| CAPTURE CONNECTED (2) | UNDETERMINED (4) | UNDETERMINED (4) |
| CAPTURE CONNECTED (2) | CAPTURE NOT CONNECTED (5) | CONFIRMED NOT CONNECTED (0) |
| CAPTURE CONNECTED (2) | ASSUMED CONNECTED (6) | CONFIRMED CONNECTED (1) |
| ASSUMED NOT CONNECTED (3) | ASSUMED NOT CONNECTED (3) | UNDETERMINED (4) |
| ASSUMED NOT CONNECTED (3) | UNDETERMINED (4) | UNDETERMINED (4) |
| ASSUMED NOT CONNECTED (3) | CAPTURE NOT CONNECTED (5) | UNDETERMINED (4) |
| ASSUMED NOT CONNECTED (3) | ASSUMED CONNECTED (6) | CONFIRMED NOT CONNECTED (0) |
| UNDETERMINED (4) | UNDETERMINED (4) | UNDETERMINED (4) |
| UNDETERMINED (4) | CAPTURE NOT CONNECTED (5) | UNDETERMINED (4) |
| CAPTURE NOT CONNECTED (5) | CAPTURE NOT CONNECTED (5) | UNDETERMINED (4) |
| CAPTURE NOT CONNECTED (5) | ASSUMED CONNECTED (6) | CONFIRMED NOT CONNECTED (0) |
| ASSUMED CONNECTED (6) | ASSUMED CONNECTED (6) | CONFIRMED CONNECTED (1) |

FIG. 14

CONFIGURATIONS TRACKING SYSTEM USING TRANSITION MANAGER TO EVALUATE VOTES TO DETERMINE POSSIBLE CONNECTIONS BETWEEN PORTS IN A COMMUNICATIONS NETWORK IN ACCORDANCE WITH TRANSITION TABLES

BACKGROUND OF THE INVENTION

1. Field of the Invention

This invention relates generally to communications networks, and more particularly to monitoring and tracking connection configurations within connection-oriented communications networks.

2. Discussion of the Related Art

Communications networks provide a capability for one device, referred to as a source, to transmit data to another device, referred to as a destination. Among the conventional types of communications are connection-oriented communications and connectionless communications.

In connection-oriented communications, a logical association is established between the source and the destination, so that several separate groups of data may be sent along the same path that is defined by the logical association. This is distinguished from connectionless communications, in which the source transmits data to the destination in an unplanned fashion and without prior coordination. In connectionless communications, each frame of data is transmitted from the source to the destination in a manner independent from the manner in which other frames are transmitted from the source to the destination. Bridges and routers are commonly used in connectionless communications.

Three phases generally occur during connection-oriented communications, including connection establishment, data transfer, and connection termination. These three phases together are commonly called a session, which may be monitored and controlled by a central authority. In the connection establishment phase, the first time a source has data to be sent to a destination, a logical association, also called the connection or a path, is established between the source and the destination. The connection defines elements and connections between the elements, for example, switches between the source and the destination, and the ports of the switches through which the data will pass from the source to the destination.

A switch, and other devices similar in operation to a switch, may be referred to as a node, intermediate system, interface message processor, or gateway. A port is an interface on a switch or similar device that provides a physical communication path to other devices, for example to other ports of other switches. During the data transfer phase, data is transmitted from the source to the destination along the connection, which includes the port-to-port connections of the switches. After a certain amount of time, or at the occurrence of a certain event, the session enters the connection termination phase, in which the connection is terminated, and the elements which made up the connection are freed to support other connections.

There may be a large number of connections which represents a very large and complex amount of connection information for a central authority to monitor. Additionally, some connections may fail, due to electrical problems or physical or logical removal of any of the elements which make up the connection. For example, a switch may be removed for maintenance or to achieve a more advantageous physical arrangement for other connections. It would thus be desirable to provide a monitoring capability for tracking connections in a connection-oriented communications network.

SUMMARY OF THE INVENTION

According to several aspects of the present invention, a network is monitored for reports indicative of a connection state among ports of a communications network. Certain ports are designated as being in a transition (e.g., new connections being made or old connections being broken), and a transition table is created for each transition. The transition table includes locations (the intersection of a row and column, where a value is stored) that directly relate the connectivity of a first port with respect to a second port, as well as locations that relate the connectivity of other ports. The contents of the transition table are evaluated to determine the likely configuration of the communications network. State machines may be used to resolve conflicting data within the transition table, by providing a likely connection output based upon different entries within the transition table. A voting scheme may also be used to evaluate the outputs of the state machines and update the transition table when appropriate, and the updated transition table may also be evaluated.

In one embodiment, a method is provided for tracking a configuration of a plurality of ports of a communications network. The method comprises the steps of determining whether any of the plurality of ports are in a transition with respect to the configuration of the plurality of ports, collecting data associated with the transition, and analyzing the data associated with the transition to determine the configuration of the plurality of ports. The step of collecting data may include receiving a report that includes an indication that a reporting port either has a connection or has lost a connection with respect to a neighbor port. The method may include waiting a predetermined amount of time prior to analyzing the data.

The step of collecting data may also include entering information from the report into a transition table that is associated with one of the reporting port and the neighbor port. The transition table may include locations populated with one of at least three different states. Additionally, the step of analyzing may include determining a likelihood of a connection between the reporting port and the neighbor port based upon locations of the transition table that either do or do not directly relate to the reporting port and the neighbor port.

The step of analyzing may include providing a first number of votes based upon data within the locations of the transition table that directly relate to the reporting port and the neighbor port, providing a second number of votes based upon data within the locations of the transition table that do not directly relate to the reporting port and the neighbor port, and evaluating the votes to determine a likelihood of a connection between the reporting port and the neighbor port. Additionally, data within the locations of the transition table that directly relate to the reporting port and the neighbor port may be updated based upon the votes to provide updated data, and the likelihood of a connection between the reporting port and the neighbor port may be determined based upon the updated data.

When a transition table associated with at least one of the reporting port and the neighbor port does not already exist, a new transition table may be created. Additionally, a merged transition table may be created by merging a first transition table associated with the reporting port with a second transition table associated with the neighbor port.

Another aspect of the invention is directed to an apparatus for tracking a configuration of a plurality of ports of a communications network, comprising means for determining whether any of the plurality of ports are in a transition with respect to the configuration of the plurality of ports, means for collecting data associated with the transition, and means for analyzing the data associated with the transition to determine the configuration of the plurality of ports.

Another embodiment of the invention is directed to an apparatus for tracking a configuration of a plurality of ports of a communications network. The apparatus comprises an event stream filter that provides data associated with at least one transition of the communications network, at least one transition table, each of which corresponds to a respective one of the at least one transition of the communications network, and a transition manager that provides a link list indicative of the configuration of the plurality of ports based upon the data of the at least one transition table.

BRIEF DESCRIPTION OF THE DRAWINGS

Other features and advantages of the present invention shall appear from the following description of an exemplary embodiment, said description being made with reference to the appended drawings, of which:

FIGS. 12, 13, and 14 illustrate state machines used to provide votes regarding possible connections based upon data of a transition table;

DETAILED DESCRIPTION

In order to provide a monitoring capability to track connections of a connection-oriented communications network, a representation that provides a virtual (i.e., logical) portrayal of the connections within a network may be developed and maintained. Within this disclosure, the term "link" refers to a model, which may be contained within a representation of a network, of a connection between one port and at least one other port. For example, a link may refer to a connection between a first port and a second port. Such a connection may be a simple connection such as a single wire, or a more complex connection such as an ETHERNET cable and associated local area network protocol layers. Additionally, the connection may include switches or hubs along with local area networks and other devices.

Figure 1:
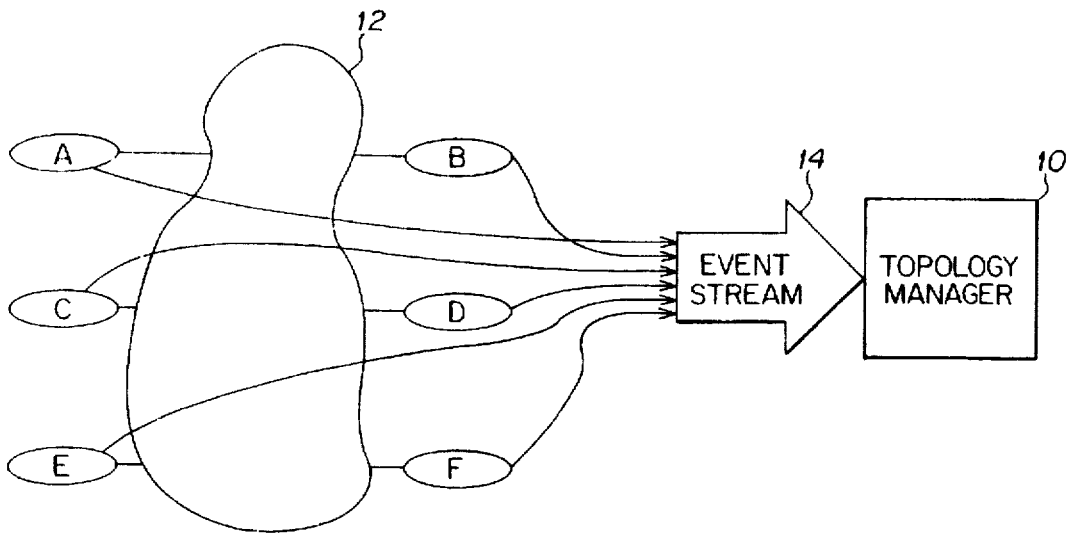
FIG. 1 illustrates a network having connection-oriented communications, which is monitored by a topology manager.

FIG. 1 shows a topology manager 10 which maintains a model of a connection-oriented network, and in particular a model of the current configuration of the elements of the network 12. As shown in FIG. 1, the topology manger 10 receives an event stream 14 from several ports A–F. These ports A–F may be connected via a network 12, which may contain several individual connections among the ports A–F. The event stream 14 includes reports (i.e., messages) which provide information indicative of current and past connections among the ports A–F of the network. In one embodiment of the invention, the reports include a new neighbor report and a lost neighbor report. Each of these reports includes a reporting port and is made with respect to a neighbor port. Typically, these reports are actually generated by a switch or another device which contains the reporting port, or from a source, destination, or other nodes within the network. For the purposes of this disclosure the report may be considered as being generated by the reporting port itself, so that the phrase "port A generates a report" actually means "a device on the network provides a report with port A included as the reporting port."

A new neighbor report is an indication that the reporting port has been connected to the neighbor port. The report "nn.Y" generated by port X represents a new neighbor report from reporting port X with respect to new neighbor Y. A lost neighbor report is an indication that a particular connection that once existed has been lost between the reporting port and the neighbor port. The report "ln.Y" generated by port X represents a lost neighbor report from reporting port X with respect to lost neighbor Y. Another type of report is a lost all neighbors report ("la"), which is indicative that a reporting port has been disconnected from all other ports. For the purposes of this disclosure, a lost all neighbors report may be considered as a plurality of individual lost neighbor reports. It is not necessary to have reports of exactly these types, as long as some information indicative of a change or a current status of the port connections is provided.

Figure 2:
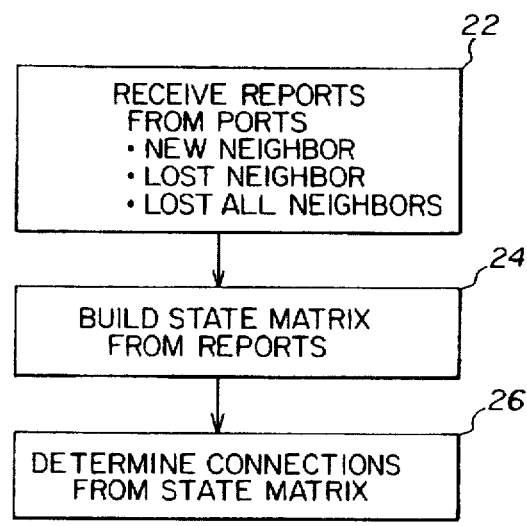
FIG. 2 shows the operation of the topology manager illustrated in FIG. 1.

As shown in FIG. 2, the topology manager 10 receives reports (step 22), generally in the form of an event stream 14, from the ports A–F of the network to be monitored by the topology manager 10. The topology manager 10 then builds a state matrix from the reports of the event stream 14 (step 24), and determines the connections of the network 12 from the contents of the state matrix (step 26). A description of a state matrix and the relationship between connections will be described with respect to FIGS. 3A–C and 5A–C.

Figures 3A, 3B, 3C:
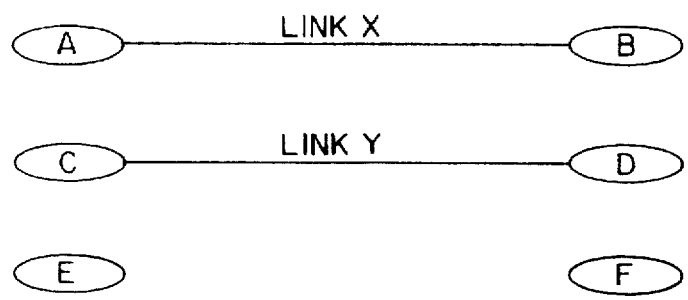
FIG. 3A illustrates a state matrix used to monitor the configuration of a network.
FIG. 3B shows an example of a network topology represented by the state matrix of FIG. 3A.
FIG. 3C is a representation of the connections of the network topology of FIG. 3B.

FIG. 3A shows a state matrix 32 used to monitor the configuration of the network that includes six ports A–F. FIG. 3D shows the six ports A–F, as well as a first connection (link X) between port A and port B, and a second connection (link Y) between port C and port D. Port E and port F are shown as having no connection in FIG. 3B. The values filled into the locations of each row of the state matrix 32 are made as a result of reports made by a reporting port with respect to a neighbor port. For example, the entries within row 321 of state matrix 32 show that port A is connected to port B (designated "1"), but is not connected to ports C, D, and E (designated "0"). The entries within row 322 indicate that port B is connected to port A, but not to ports C, D, and E. Rows 323, 324, 325 and 326 show similar information regarding the connections of ports C, D, E and F. The upper left to lower right diagonal of the state matrix 32 is an identity vector (designated '-'), which typically has no significance because it would represent a port's connection to itself.

From the data contained within a state matrix 32, a system such as a topology manager 10 may determine the current connections of the network 12, for example by reading across each row to determine which ports are connected to which other ports. The information of each row may be confirmed by information of another row. For example, the indication of row 321 that port A is connected to port B may be confirmed by the indication of row 322 that port B is connected to port A. Such connections may be described in terms such as shown in FIG. 3C. FIG. 3C is an object representation of the links X and Y of the network 12. The term X.ports=[A,B] is indicative that port A and port B are included in link X. The term Y.ports=[C,D] is indicative that port C and port D are included in link Y.

Figure 4:
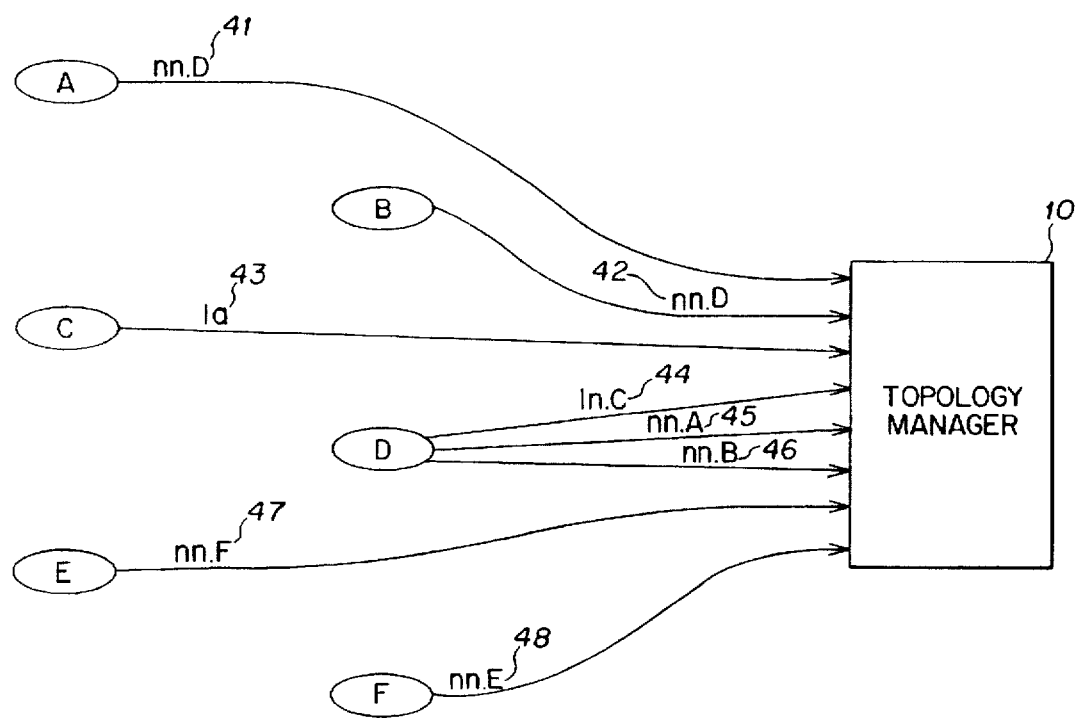
FIG. 4 depicts an event stream resulting from a transition of a network from the topology illustrated in FIG. 3B.
Figures 5A, 5B, 5C:
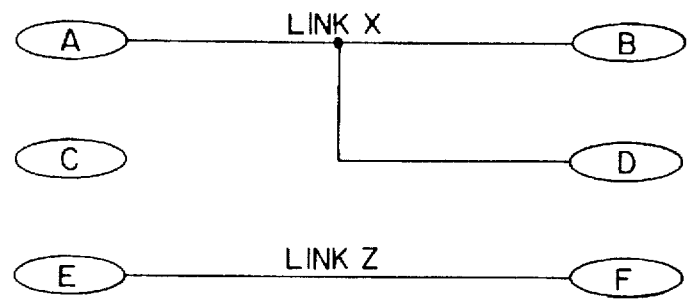
FIG. 5A illustrates a state matrix resulting from the event stream of FIG. 4.
FIG. 5B shows a network topology that is a result of the transition of the event stream of FIG. 4.
FIG. 5C is a representation of the connections of the network topology of FIG. 5B.

When the network 12 undergoes a transition, for example new connections being made or old connections being broken, then the ports will provide reports in the event stream 14, from which the topology manager 10 may update the state matrix 32, and in turn determine the status of the links of the network 12. FIG. 4 depicts an event stream, including reports from ports A, B, C, D, E, and F, which may be made in response to a network 12 transitioning from a topology as shown in FIG. 3B to a topology as shown in FIG. 5B. In particular, in this example, port D has been disconnected from port C, port D has been connected to the connection that includes ports A and B, and ports E and F have been connected together. Port A has reported "nn.D" 41 ("new neighbor D"), indicative that port D is a new neighbor of port A. Port B has similarly reported "nn.D" 42, indicative that port D is a new neighbor of port B. Port C has reported "la" 43 ("lost all neighbors"), indicative that port C has lost all neighbors, and now has no connection. Port D has reported "ln.C" 44 ("lost neighbor C"), indicative that port D has lost the connection with port C, and "nn.A" 45 and "nn.B" 46 indicative of the new connections to ports A and B. Finally, ports E and F have reported their new connection, with reports, "nn.F" 47 and "nn.E" 48 respectively.

FIG. 5B represents the network connection configuration which caused the ports A–F to make the reports shown in FIG. 4. As shown in FIG. 5B, ports A, B, and D are connected together, port C is not connected to any other port, and port E is connected to port F. FIG. 5A shows state matrix 32 which has been updated to show the new configuration as a result of receiving the reports 41–48 shown in FIG. 4. Finally, FIG. 5C shows terms which the topology manager may use to describe the new connection arrangement. In particular, FIG. 5C shows X.ports=|A,B,D| and Z.ports=|E, F|.

As shown in FIGS. 3A and 5A, it is possible that the information of one row of the state matrix 32 confirms the connection information of another row. However, it is also possible that the state matrix 32 contains contradictory or conflicting information. There may be several reasons for this contradictory information, for example lost communications from the reporting ports, faults within the ports causing inaccurate reports, a transition in process, or reports received out of order. If a port sends a report but the report is lost, then the reporting port column of the state matrix 32 will not be updated. For example, if report 42 from port B of FIG. 4 were lost, then the state matrix 32 would not have updated row 322 to show that port B is connected to port D. In contrast, such a connection would have been indicated by the report 46 from port D, and row 324 of the state matrix 32 would have been updated to show that port B is connected to port D. The state matrix 32 would thus contain contradictory information, because row 322 and row 324 would indicate different topologies with respect to a possible connection between port B and port D.

As mentioned above, contradictory information may also be contained within the state matrix 32 if faulty information is provided. For example, there may be a fault within port B so that port B either reported bad information or no new information at all.

Additionally, a state matrix 32 may contain contradictory information simply because the network is in a transition. Typically, the reports 41–48 of FIG. 4 will not all arrive at the topology manger 10 at precisely the same time, nor would the results of the reports be entered into the state matrix 32 at precisely the same time. Thus, if some but not all of the reports have been received, the state matrix 32 will contain contradictory information. For example, this would be the case if the report 42 had not arrived, but all other reports had arrived. The delay in reports may be due to communication or processing delays, or due to a situation in which the network 12 is being reconfigured in response to other reconfigurations. For example, the connection from port D to ports A and B may have been created because the connection between port D and port C was lost. In such an instance, the reports from the involved elements would not have been generated at the same time.

Another cause of contradictory information may be the order in which reports of the event stream 14 are received by the topology manager 10. If a report from a previous transition is received following a report from a later transition, the state matrix 32 will overwrite the report from the later transition with the report from the previous transition, even though the later transition occurred after the previous transition.

One approach to manage potentially contradictory information within a state matrix 32 is to delay a certain amount of time before making any decisions from the state matrix 32, regarding the configuration of a network 12. However, this approach is only effective if ultimately the appropriate reports arrive that negates the contradictory information. If the contradictory information was the result of a lost message, the appropriate report may never arrive.

Figure 6:
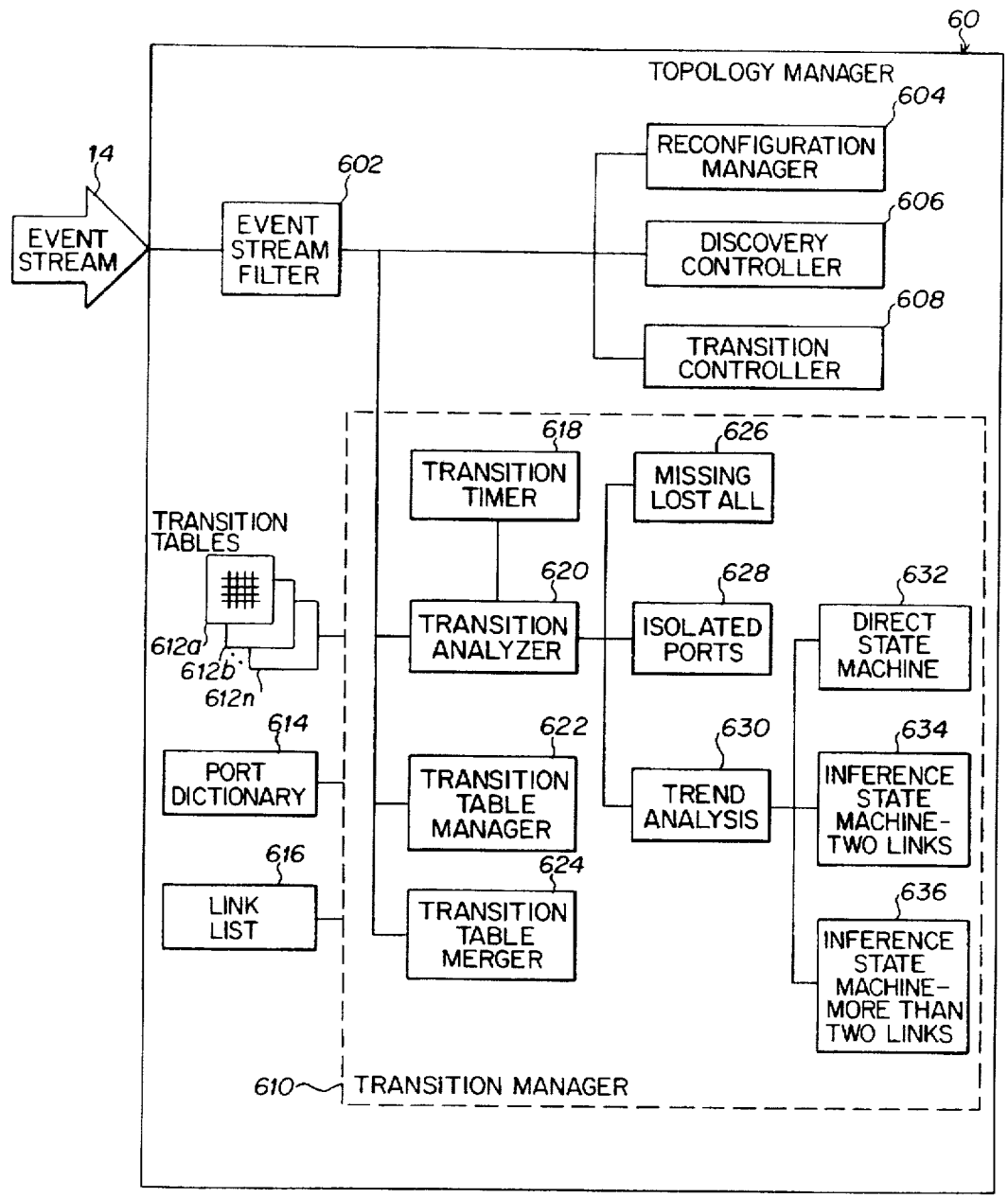
FIG. 6 illustrates an embodiment of a topology manager in accordance with an embodiment of the invention.

Another approach to manage potentially contradictory information is an embodiment of this invention, as shown in FIG. 6. FIG. 6 shows a topology manager 60 that receives the event stream 14. The topology manager 60 includes an event stream filter 602 that receives the event stream 14. The topology manager also includes a reconfiguration manager 604, discovery controller 606, transition controller 608, and transition manager 610. Also connected to the transition manger 610, and available to the other elements of the topology manger 60, are transition tables 612a, 612b, . . . 612n, port dictionary 614, and link list 616. One embodiment of the transition manager 610 is also shown in FIG. 6, which includes a transition timer 618, transition analyzer 620, transition table manager 622, and transition table merger 624. The transition analyzer 620 is also connected to a missing lost all module 626, an isolated ports module 628, and a trend analysis module 630. The trend analysis module is connected to a direct state machine 632, an inference state machine 634 to be used when there are two links anticipated, and an inference state machine 636 to be used when there are more than two links anticipated.

The topology manager 60 may be implemented as a software module, for example an object-oriented software module. For example, the link list 616 may include an object representation "link X.ports=[A,B,C]" for a connection called "X" that includes ports A, B, and C. In object-oriented terminology, this would mean that X is an instantiation of a class called link, and contains individual objects A, B and C. Such an approach may be useful for maintaining relationships (connections) between the ports of a network, as well as maintaining attributes (data) of the ports.

Additionally, in one embodiment, the different subelements of the topology manager 60 are implemented as software on a floppy disk or hard drive, which controls a computer, for example a general purpose computer such as a workstation, a mainframe or a personal computer, to perform steps of the disclosed processes. Such a general purpose computer may be connected to the network in order to receive reports, and may provide commands to devices on the network in order to control the network configuration.

Alternatively, the sub-elements of the topology manager 60 may be implemented as special purpose electronic hardware. Additionally, in either a hardware or software embodiment, the functions performed by the different elements within the topology manager 60 may be combined in different arrangements.

Figure 7:
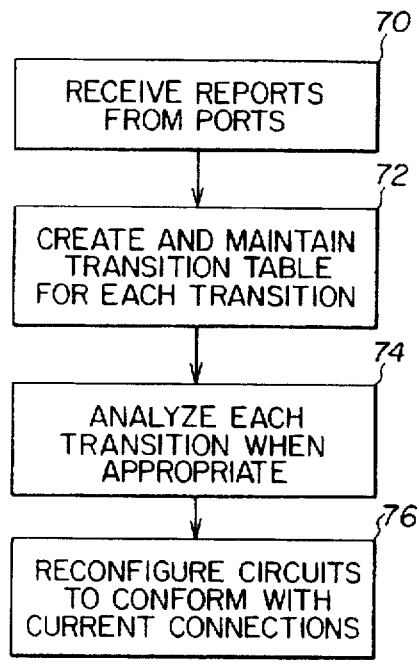
FIG. 7 is a flow diagram of a process performed by a topology manager.

Operation of the topology manager 60 is depicted in FIG. 7. As shown in FIG. 7, the topology manager receives reports from ports (step 70). As mentioned earlier, the reports may be included within the event stream 14. As a result of the reports received in step 70, a transition table is created and maintained for each transition (step 72). Generally, the topology manager 60 will initiate a transition as a result of receiving a report that is indicative of one port reporting a change, for example a new neighbor port or a lost neighbor port. Additionally, when it is deemed appropriate, each transition is analyzed (step 74) in order to determine the current connections. In general, the transition will be resolved to be one of four states. These four states include one or more ports being isolated from a link, a link having been partitioned, multiple links having been merged into a single link, or a number of links having been moved from a previous link to a successor link. The resolution, determined as a result of step 74, may include a link list 616 which takes the form of the lists of FIGS. 3C and 5C. As a result of the resolution in which current connections are determined, the appropriate circuits of the network 12 may be reconfigured (step 76), by reconfiguration manager 604 in order that the network 12 conforms with the current connections.

Figure 8:
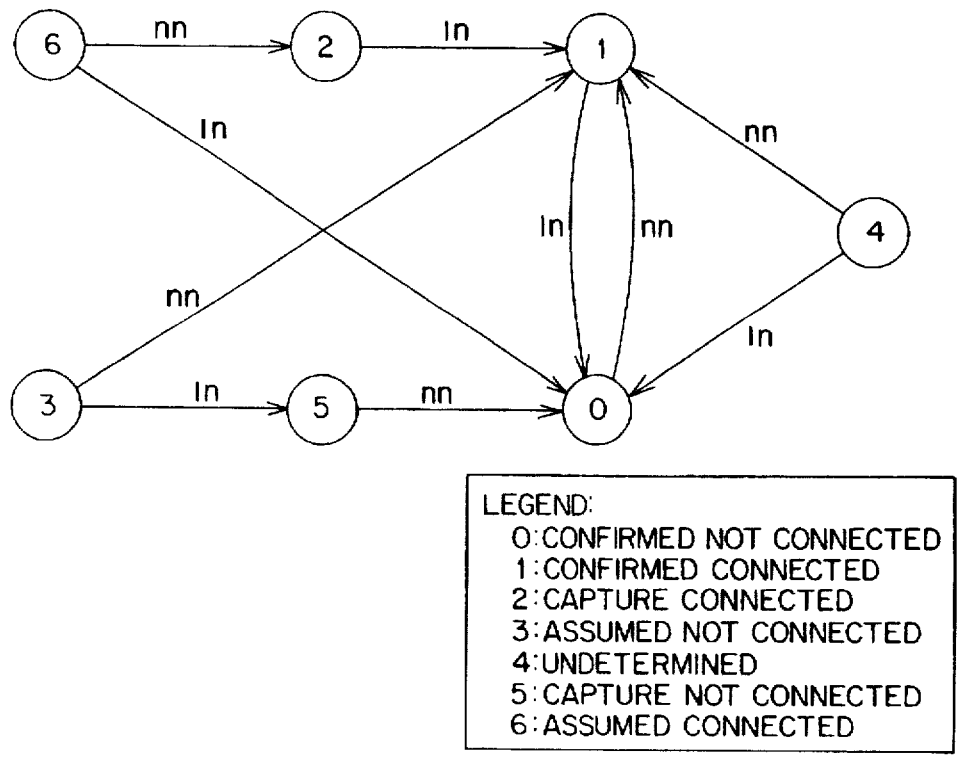
FIG. 8 is a state diagram showing states of a transition table resulting from receipt of an event stream by the topology manager of FIG. 6.

FIG. 8 shows a state diagram for an embodiment of the invention in which each location within a transition matrix 612 may be one of seven different states; this is one aspect of the invention which facilitates tracking connection configurations in the presence of potential contradictory information. These states are shown in the legend of FIG. 8 as follows:

0: Confirmed Not Connected
1: Confirmed Connected
2: Capture Connected
3: Assumed Not Connected
4: Undetermined
5: Capture Not Connected
6: Assumed Connected State 1, confirmed connected, and state 0, confirmed not connected, are similar to the "1" and "0" entries within a state matrix 32. State 4 is an undetermined state, which typically represents a situation in which there is no information regarding a possible connection. States 3 and 6 may be used to represent, for example, that some prior information is indicative of either a connection (state 6) or a lack of a connection (state 3), but confirmation has not been received. From state 3, a report can cause a change of state to either state 1 confirmed connected, or state 5 capture not connected. From state 5, an additional report can cause the state to be changed to state 0 confirmed not connected. From state 6, a report can cause a change of state to either state 0 confirmed not connected, or state 2 capture connected. From state 2, an additional report can cause the state to be changed to state 1 confirmed connected.

FIG. 8 also shows the transitions between the different states that are made by the transition table manager 622 as a result of the topology manager 60 receiving reports regarding a relationship between two ports, for example the "nn" and "ln" reports in FIG. 8. For example, if a particular location of the transition table 612a that represents reporting Port A with respect to neighbor Port B, is currently in state 4, undetermined, and then the topology manager 60 receives a "nn" from port A with respect to port B, then the particular location of the transition table 612a will be changed from a "4" to a "1", indicating that port A believes that port A is connected to port B. The state diagram of FIG. 8 shows similar transitions for other information received based upon a previous state. Initialization rules may be applied in order to initialize each location of a transition table 612. One example of such a rule is that each location may be initialized to state 4, undetermined. However, a topology manager 60 may have other information, perhaps manually entered by a user, regarding the potential state of each connection within a network 12, so that some locations may be initialized to either state 6 assumed connected, or state 3 assumed not connected.

Figure 9:
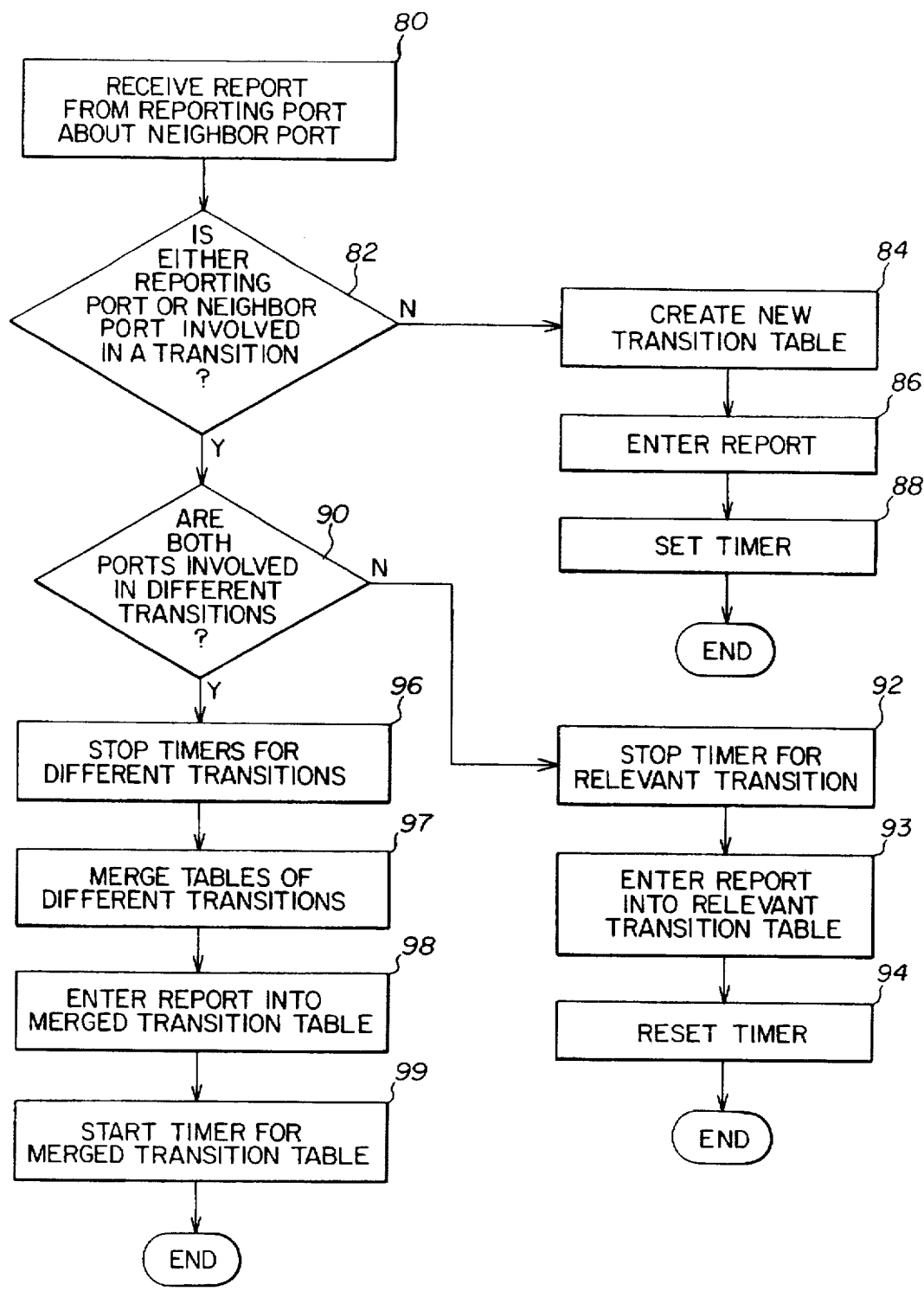
FIG. 9 shows detail of the creation and maintenance of a transition table in accordance with one embodiment of the topology manager of FIG. 6.

An example of operation of the transition table manager 622 is depicted in FIG. 9. In step 80, a report is received from a reporting port regarding a neighbor port. The transition table manager 622 determines whether either the reporting port or the neighbor port is currently involved in a transition 612a, . . . 612n (step 82). If not, then in step 84 a new transition table 612 is created, and the information from the report is entered into the new transition table 612 in step 86. In step 88, a timer is set, so that an analysis of a transition may be triggered when no reports regarding that transition have been received for a certain amount of time. The lack of reports being received for a certain amount of time may be indicative that the transition has been completed. The transition timer 618 may be used for this purpose. In one embodiment, a predetermined time of 90 seconds is used as a value for the transition timer 618, which allows for reception of the reports associated with a topology change. Alternatively, a different predetermined time could be used depending upon the number of switches in a network, or on other network characteristics.

If either port is involved in a transition, then in step 90 it is determined whether both ports are involved in different transitions. If so, then both timers for the different transitions are stopped (step 96), the transition table merger 624 is invoked to merge the two transition tables of the different transitions, (step 97), the report is entered into the resulting merged transition table (step 98), and the timer for the merged transition table is reset and started (step 99).

If both ports are not involved in different transitions, the timer for the relevant transition is stopped (step 92), the report is entered into the relevant transition table (step 93), and the timer is reset to the initial value and restarted (step 94). Because the timer of a particular transition is reset when a relevant report for that transition is received, the timer typically times out only when a certain amount of time has passed in which no relevant reports have been received for that particular transition.

Figure 10A:
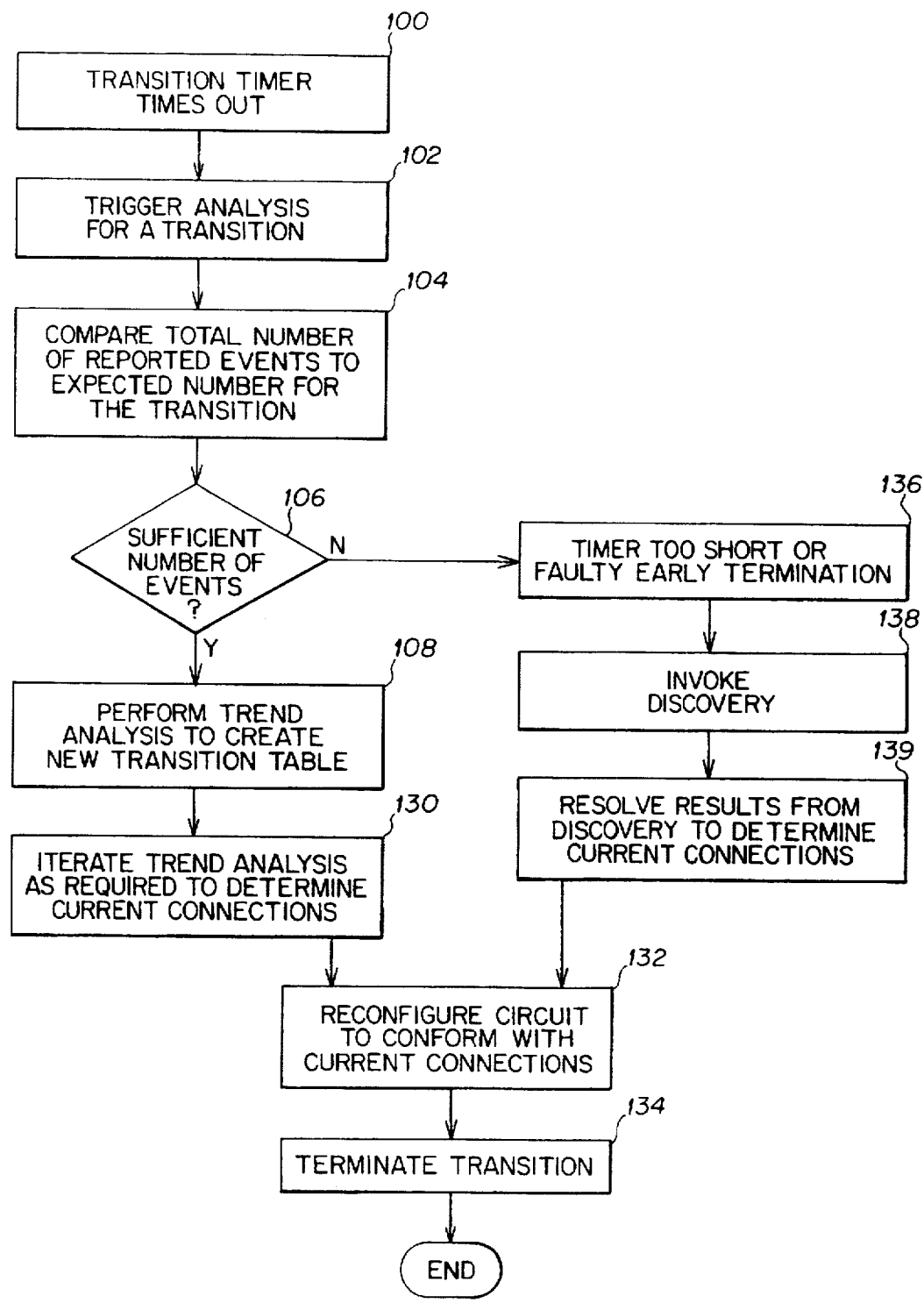
FIG. 10A is a flow diagram showing one embodiment of a transition analysis function.

Operation of one embodiment of the transition analyzer 620 is shown in FIG. 10A. The transition analyzer 620 is triggered (step 102) when the transition timer 618 for a particular transition times out (step 100). Accordingly, the total number of reported events is compared to the expected number for the transition under analysis (step 104). If there are a sufficient number of reported events (step 106), then trend analysis is performed to create a new transition table with conflicts resolved (step 108). If necessary, the trend analysis may be further iterated (step 130). If there are not a sufficient number of events, then it is likely that the timer is too short, or there is some other type of faulty termination (step 136). Accordingly, discovery is invoked in which the devices having the ports involved in the transition under analysis (step 138), and the results of the discovery may be used to determine the current connections (step 139). Discovery, in this context, refers to querying the appropriate devices or ports directly to obtain information regarding their connectivity. From either step 130 or step 139, the process continues to step 132, in which the relevant devices (also referred to as circuits) of the network are reconfigured to conform with the current connections. In step 134, the transition is terminated.

Figure 10B:
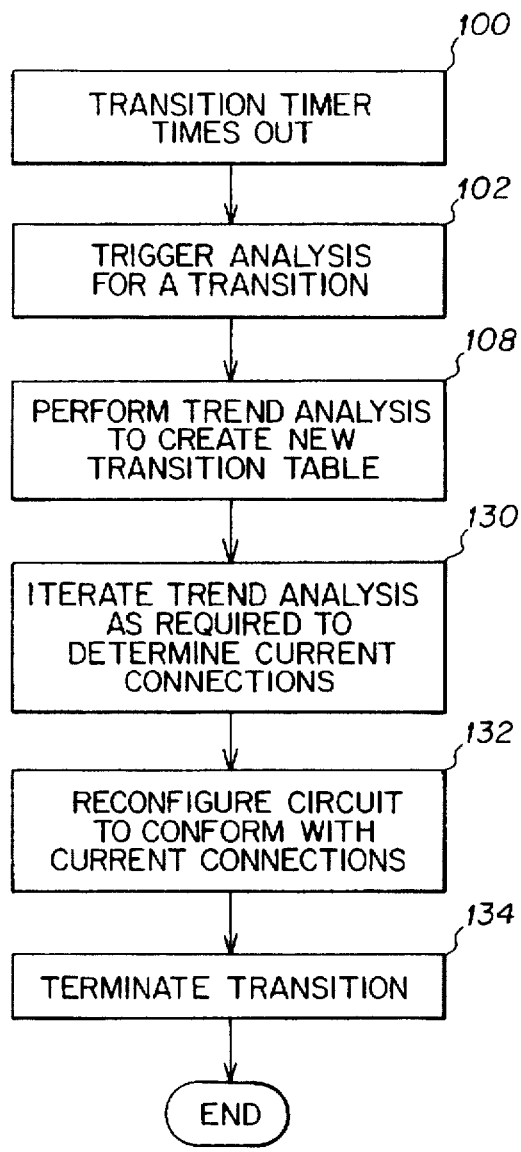
FIG. 10B is a flow diagram of another embodiment of the transition analysis function.

Another embodiment of the transition analyzer 620 is shown in FIG. 10B. As shown in FIG. 10B, the analysis may be triggered without regard to the total number of expected reports, and trend analysis may be performed whenever the transition timer times out (step 100).

Figure 11:
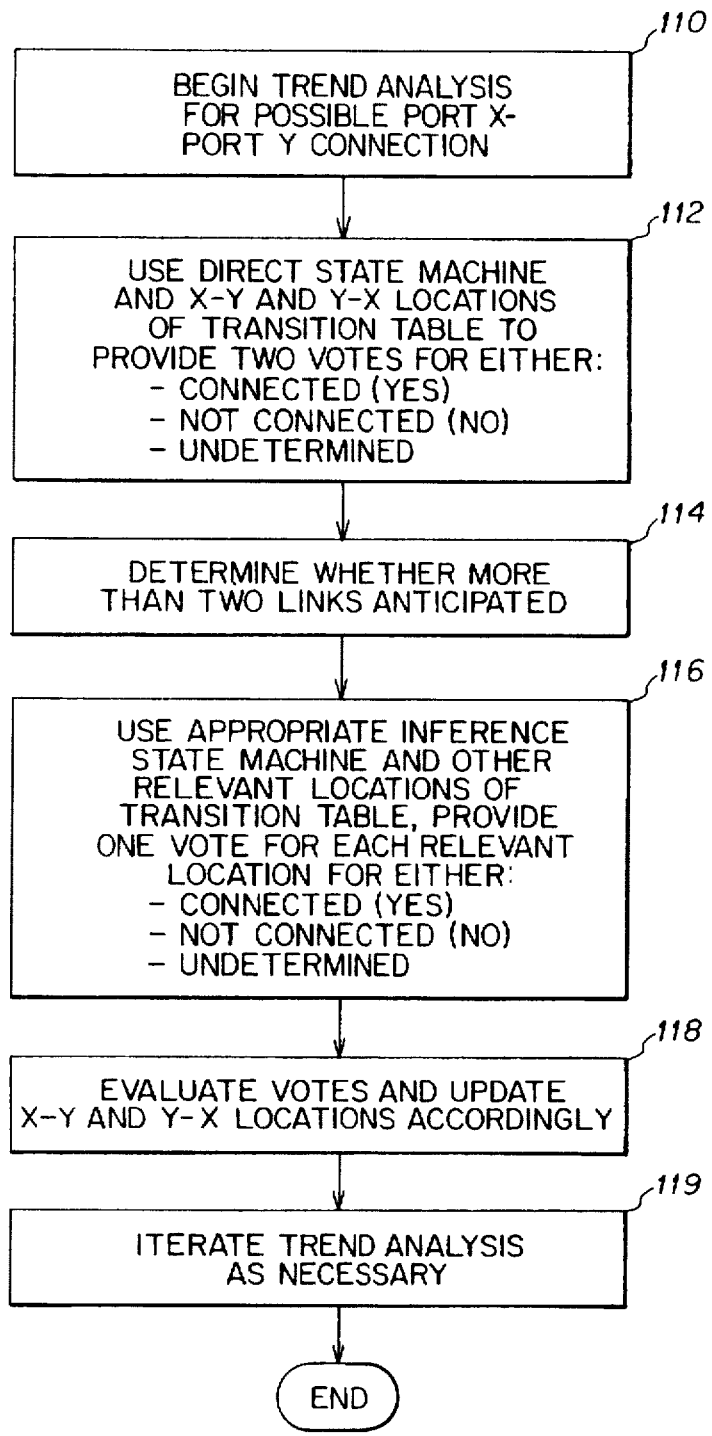
FIG. 11 shows detail of the trend analysis performed to evaluate and update locations of a transition table.

FIG. 11 shows detail of one embodiment of the trend analysis (step 108). For a given port X to port Y connection, the trend analysis is initiated (step 110). The flow diagram of FIG. 11 may then be repeated for each port combination in the transition table. There are two "direct" locations within the transition table 612 with respect to port X and port Y, location X-Y and location Y-X. From the data in each of these locations, an implication may be created with respect to whether the ports X and Y are connected. For example, if both locations are confirmed not connected (0), then it is relatively certain that there is not a connection between ports X and Y. Other combinations may also be indicative of the actual status, as shown in FIG. 12, which shows detail of one embodiment of the direct state machine 632. In step 112, the X-Y and Y-X values with in the transition table are input to the direct state machine, and the direct state machine 632 returns a result, either confirmed not connected, confirmed connected, or undetermined (step 112). From the results returned from the direct state machine 632, the status of the possible port X-portY connection may be resolved.

Additionally, other locations of the transition table may be used to infer a result with respect to the connectivity of port X and port Y. For example, if port Z is connected to port A and port Z is also connected to port B, it may be inferred that port A is connected to port B. Also, if port Z is not connected to port A and port Z is connected to port B, it may be inferred that port A is not connected to port B. Moreover, if it is known that there are only two links in total, then if port Z is not connected to port A and port Z is not connected to port B, then it may be inferred that port A is connected to port B. If, however, there may be three or more links, then no information is gained. FIG. 13 shows the inference state machine 634, used when it is known that there are no more than two links. FIG. 14 shows the inference state machine 636 that may be used when it is known or anticipated that there are more than two links.

More than two links may be known or anticipated as a result of a transition having already accumulated a certain number of links prior to a beginning of the transition being analyzed. Additionally, interim results of the trend analysis may be monitored to determine whether there is an indication that more than two links may be anticipated. One manner in which to achieve this is to build connectivity sets which represent potential links, during trend analysis. These connectivity sets may be referred to as segments. If more than two segments exist during the trend analysis, it may be determined that more than two links are involved.

Accordingly, it is possible to perform a first portion of the trend analysis using inference state machine 634 for two links, and a second portion of the same trend analysis using inference state machine 636 for more than two links.

After it is determined whether more than two links are anticipated (step 114), then the appropriate inference state machine 634, 636 may be used together with other relevant locations of the transition table, to create a resulting inference for connection between port A and port B. The other relevant locations of the transition table are typically the locations which represent an intersection between either the reporting port and another port, or between the neighbor port and another port. However, certain locations may be deemed to be not relevant by the isolated ports module 628. Generally, an isolated port is one that has no indication of being connected to other ports, such as a port that has recently provided a "lost all" report.

In one embodiment, specifically represented in FIG. 11, a voting scheme is used as a result of the direct analysis (step 112) and the inference analysis (step 116). In this voting scheme, two votes are provided for one of the three states (connected, not connected, or undetermined) as a result of the direct analysis (step 112), and a single vote for each relevant location is provided for one of the three states as a result of the inference analysis (step 116). The votes are then evaluated and the X-Y and Y-X locations of the transition table are updated accordingly (step 118). If desired, the trend analysis may be further iterated to resolve any remaining ambiguities (step 119).

Figure 15:
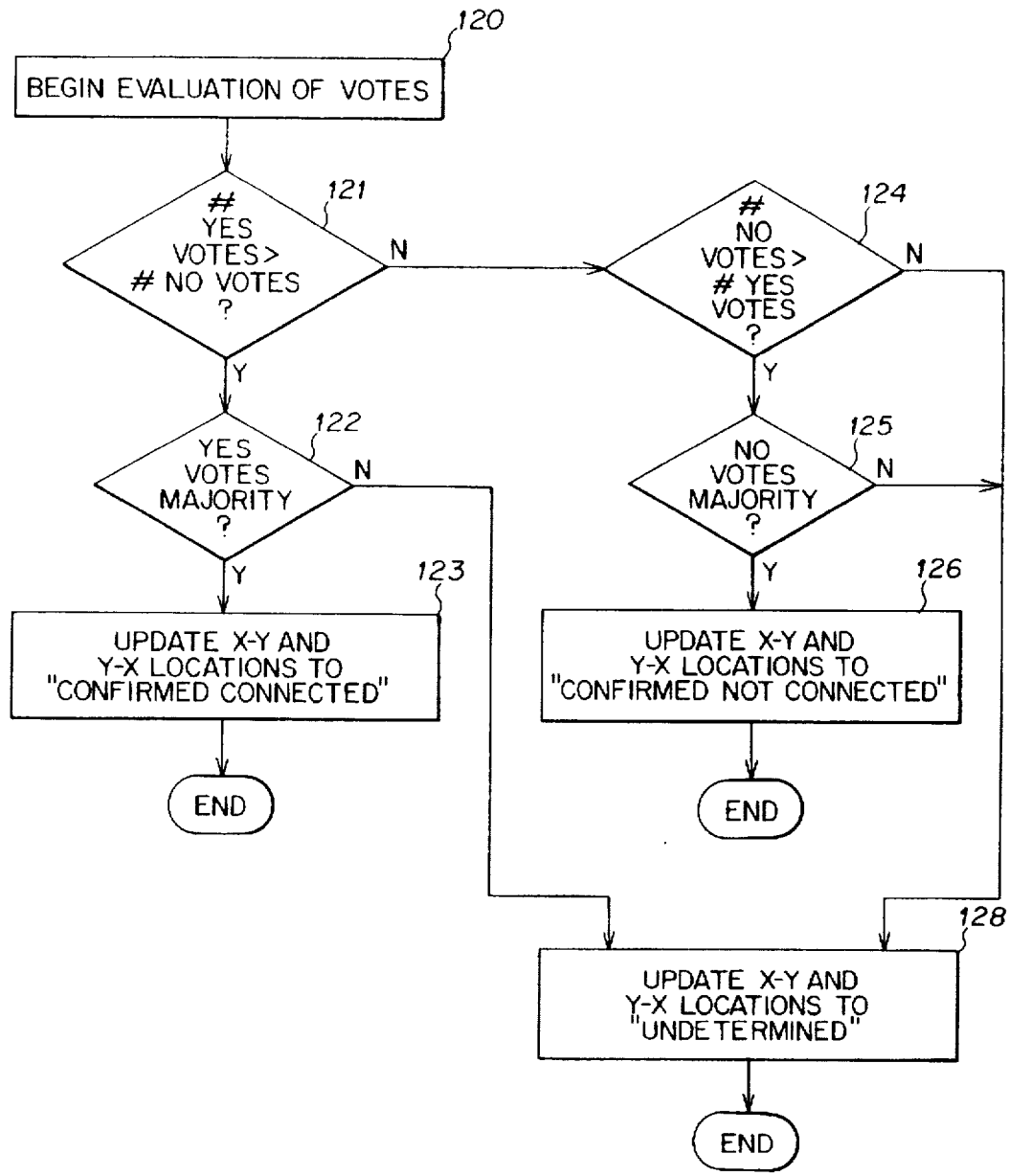
FIG. 15 shows steps of a method for evaluating the votes generated by the state machines of FIGS. 12, 13, and 14.

FIG. 15 shows one approach to performing the vote evaluation of step 118. In step 120, the process is started. In step 121, it is determined whether the number of yes votes (connected) is greater than the number of no votes (not connected). If so, the process continues to step 122, where it is determined whether the yes votes represent a majority of all votes with respect to the port A, port B pair. If so, then the X-Y and Y-X locations are updated to a confirmed connected (1) state in step 123. If there are not more yes votes than no votes (step 121), then it is determined whether the number of no votes is greater than the number of yes votes (step 124). If so, then in step 125 it is determined whether the no votes represent a majority of all votes. If so, then the X-Y and Y-X locations are updated to a confirmed not connected (0) state in step 126. If there are an equal number of yes votes and no votes, or if the number of yes votes or the number of no votes does not represent a majority of the votes, then it may be because there is a significant amount of uncertainty in the analysis. Accordingly, in step 128 the X-Y and Y-X locations are both updated to an undetermined (4) state.

Figure 16:
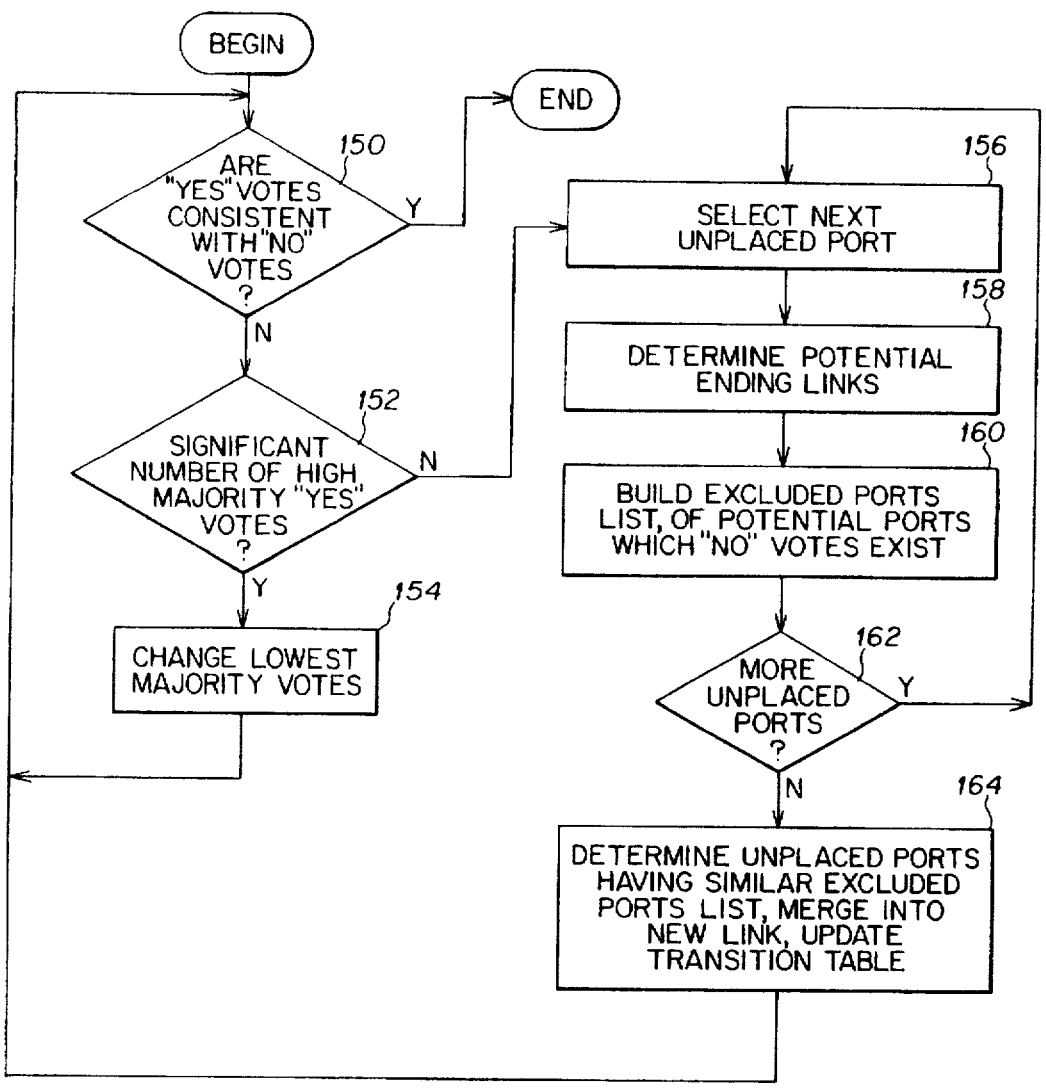
FIG. 16 shows a flow diagram for an embodiment of the trend analysis iteration step of FIG. 11.

FIG. 16 shows a process flow diagram for one embodiment of trend analysis iteration step 119 of FIG. 11. In step 150, it is determined whether the yes votes are consistent with the no votes. If there are no inconsistencies, then no further iteration is performed. If there are inconsistencies, then it is determined whether there are a significant number of high majority yes votes (step 152). The significant number may be a predetermined number or percentage, for example more than 50% of all votes. If there are a significant number of high majority yes votes, then selected low majority votes may be changed (step 154), and the process returned to step 150. For example, it may be desirable to first change the lowest majority votes, and further iterate the process.

If there are not a significant number of high majority yes votes, then in step 156 an unplaced port may selected. An unplaced port is one which does not belong to a link following the vote evaluation of step 118. Potential ending links (a source or destination of a connection) for the unplaced port are determined in step 158 and an excluded ports list is built from the potential ending links for which a no vote existed in the transition table (step 160). Step 162 iterates the building of excluded ports lists for other unplaced ports. Then, in step 164, the excluded ports lists are compared to determine unplaced ports which have the same excluded ports lists. Those ports with similar excluded ports lists are merged into a new link, and the transition table is updated accordingly (step 164). The yes votes may then be evaluated again (step 150) to determine whether further iteration is required. Accordingly, the topology manager 60 is able to effectively determine the network configuration in the presence of a significant amount of conflicting information.

Figure 17A:
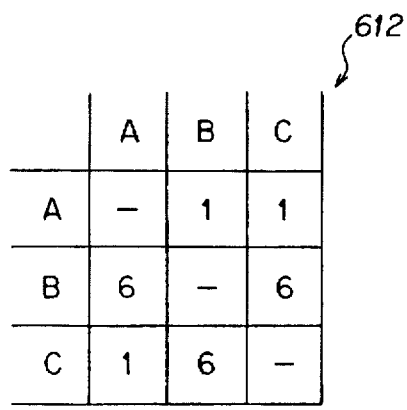
FIG. 17A illustrates an example transition table prior to trend analysis.

FIG. 17A illustrates an example of a transition table 612, for a newly-created connection among ports A,B, and C, prior to trend analysis. As indicated by the contents of the transition table 612, the topology manager 60 in this example has received reports that port A is connected to both port B and port C, and that port C is connected to port A. For example, port A may have generated reports "nn.B" and "nn.c," and port C may have generated report "nn.A." No reports have been received yet from port B, and the report "nn.B" has not yet been received from port C.

Figure 17B:
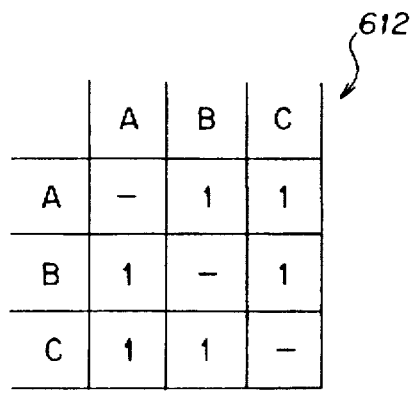
FIG. 17B illustrates the transition table of FIG. 17A subsequent to trend analysis.

Subsequent to trend analysis, the transition table 612 of FIG. 17A would appear as shown in FIG. 17B. In particular, in accordance with step 112 of FIG. 11, the direct state machine 632 is used to provide two votes with respect to the connection status of each pair of ports. The entry in location A-B is a "1", and the entry in location B-A is a "6", so the direct A-B connection result is two votes for confirmed connected "1". Additionally, in accordance with step 116, the indirect state machine 634 is used to provide a single vote with respect to the connection status of the AB port pair. In particular, because the entry in location C-A is a "1" and the entry in location C-B is a "6", the indirect A-B connection result is one more vote for confirmed connected "1". Therefore, the entry in location B-A has been changed from a "6" in FIG. 17A to a "1" in FIG. 17B. Similar changes are made to the other locations of FIG. 17B and as a result, the ambiguities associated with the incomplete status of FIG. 17A have been resolved.

As described above, a transition table may be created for each transition among ports of a communications network, based upon reports received from elements of the communications network. The transition table includes locations that directly relate the connectivity of a first port with respect to a second port, as well as locations that relate the connectivity of other ports. The contents of the transition table are evaluated to determine the likely configuration of the communications network, even in the presence of contradictory or incomplete data. State machines may be used to resolve contradictory data within the transition table, by providing a likely connection output based upon different entries within the transition table. A voting scheme may also be used to evaluate the outputs of the state machines and update the transition table when appropriate, and the updated transition table may also be evaluated.

Having thus described at least one embodiment of the invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereto.

What is claimed is:

1. An apparatus for tracking a configuration of a plurality of ports of a communications network, comprising:

an event stream filter having an input that receives a plurality of reports from the communications network, and an output that provides data associated with at least one transition of the communications network;

at least one transition table, each of which corresponds to a respective one of the at least one transition of the communications network; and a transition manager, having an input that receives data of the at least one transition table, and an output that provides a link list indicative of the configuration of the plurality of ports based upon the data of the at least one transition table; wherein the transition manager includes a transition analyzer that creates votes regarding a possible connection between a first port and a second port of the communications network based upon the at least one transition table, the transition analyzer evaluating the votes to determine a likelihood of a connection between the first port and the second port.

2. The apparatus of claim 1, wherein the transition manager includes:

a state machine having an input that receives data from locations of a first table of the at least one transition table that directly relates to a first port and a second port of the communications network, and an output that provides an indication of whether the first port is connected to the second port; and a transition analyzer, having a first input that receives data of the first transition table, a second input that receives the output of the state machine, and an output that represents a likelihood of a connection between the first port and the second port.

3. The apparatus of claim 1, wherein the transition manager includes:

a state machine having an input that receives data from locations of a first table of the at least one transition table that do not directly relate to a first port and a second port of the communications network, and an output that provides an indication of whether the first port is connected to the second port; and a transition analyzer, having a first input that receives data of the first transition table, a second input that receives the output of the state machine, and an output that represents a likelihood of a connection between the first port and the second port.

4. The apparatus of claim 1, wherein the transition analyzer includes means for updating data within the at least one transition table based upon the votes to provide updated data, the transition analyzer evaluating the updated data to determine the likelihood of a connection between the first port and the second port.

5. The apparatus of claim 1, wherein the transition manager includes a transition table manager having an output that creates a new transition table when the at least one transition table does not include an existing transition table that is associated with a port of the communications network included in one of plurality of reports.

6. The apparatus of claim 1, wherein:

the at least one transition table includes a first transition table associated with a first port included in one of the plurality of reports, and a second transition table associated with a second port included in the one of the plurality of reports; and the transition manager includes a transition table merger having an output creates a merged transition table by merging the first transition table with the second transition table.

7. The apparatus of claim 1, wherein:

the at least one transition table includes a plurality of locations, each of the plurality of locations containing a state value that represents a connection state of a first port of the communications network with respect to a second port of the communications network; and each of the plurality of locations is populated with one of at least three states.

8. The apparatus of claim 7, wherein the at least three states includes:

a first state indicative of a confirmed connection between the first port and the second port;

a second state indicative of a confirmed lack of a connection between the first port and the second port; and at least one third state indicative of an uncertainty with respect to a possible connection between the first port and the second port.

9. The apparatus of claim 1, wherein the transition manager includes a transition timer having an output that triggers initiating a transition analysis of a selected transition by the transition manager following a predetermined amount of time from when a report associated with the selected transition was received by the event stream filter.

10. A method for tracking a configuration of a plurality of ports of a communications network, comprising the steps of:

(a) determining whether any of the plurality of ports are involved in a transition with respect to the configuration of the plurality of ports;

(b) collecting data associated with the transition by receiving a report that includes an indication that a reporting port of the communications network has a particular connection state with respect to a neighbor port of the communications network and entering information from the report into a transition table associated with one of the reporting port and the neighbor port; and (c) analyzing the data associated with the transition by analyzing the transition table to determine the configuration of the plurality of ports, wherein the step of analyzing includes the steps of:

providing a first number of votes based upon data within the locations of the transition table that directly relate to the reporting port and the neighbor port;

providing a second number of votes based upon data within the locations of the transition table that do not directly relate to the reporting port and the neighbor port; and evaluating the first number of votes and the second number of votes to determine a likelihood of a connection between the reporting port and the neighbor port.

11. The method of claim 10, wherein the step of analyzing includes determining a likelihood of a connection between the reporting port and the neighbor port based upon data within locations of the transition table that directly relate to the reporting port and the neighbor port.

12. The method of claim 10, wherein the step of analyzing includes determining a likelihood of a connection between the reporting port and the neighbor port based upon location of the transition table that do not directly relate to the reporting port and the neighbor port.

13. The method of claim 10, wherein the step of evaluating includes the steps of:

updating the data within the locations of the transition table that directly relate to the reporting port and the neighbor port based upon the first number of votes and the second number of votes to provide updated data; and determining the likelihood of a connection between the reporting port and the neighbor port based upon the updated data.

14. The method of claim 10, wherein:

step (b) includes creating a transition table containing the data associated with the transition when a previous transition table associated with at least one of the reporting port and the neighbor port does not previously exist; and step (c) includes analyzing the transition table.

15. The method of claim 14, wherein step (b) includes creating a transition table having locations populated with one of at least three states including a state indicative of uncertainty.

16. The method of claim 10, wherein:

step (b) includes creating a merged transition table by merging a first transition table associated with the reporting port with a second transition table associated with the neighbor port; and step (c) includes analyzing the merged transition table.

17. The method of claim 10, wherein the step of receiving the report includes receiving a new neighbor report that includes an indication that a reporting port of the communications network has a connection to a neighbor port of the communications network.

18. The method of claim 10, wherein the step of receiving the report includes receiving a lost neighbor report that includes an indication that a reporting port of the communications network has lost a connection with a neighbor port of the communications network.

19. The method of claim 10, wherein step (c) includes waiting a predetermined amount of time subsequent to step (b) prior to analyzing the data associated with the transition.

20. An apparatus for tracking a configuration of a plurality of ports of a communications network, the apparatus comprising:

first means for determining whether any of the plurality of ports are involved in a transition with respect to the configuration of the plurality of ports;

second means for collecting data associated with the transition by receiving a report that includes an indication that a reporting port of the communications network has a particular connection state with respect to a neighbor port of the communications network and entering information from the report into a transition table associated with one of the reporting port and the neighbor port; and third means for analyzing the data associated with the transition by analyzing the transition table to determine the configuration of the plurality of ports, the third means including:

means for providing a first number of votes based upon data within the locations of the transition table that directly relate to the reporting port and the neighbor port;

means for providing a second number of votes based upon data within the locations of the transition table that do not directly relate to the reporting port and the neighbor port; and means for evaluating the first number of votes and the second number of votes to determine a likelihood of a connection between the reporting port and the neighbor port.

21. The apparatus of claim 20, wherein the means for analyzing includes means for determining a likelihood of a connection between the reporting port and the neighbor port based upon data within locations of the transition table that directly relate to the reporting port and the neighbor port.

22. The apparatus of claim 20, wherein the means for analyzing includes means for determining a likelihood of a connection between the reporting port and the neighbor port based upon locations of the transition table that do not directly relate to the reporting port and the neighbor port.

23. The apparatus of claim 20, wherein the means for evaluating includes:

means for updating the data within the locations of the transition table that directly relate to the reporting port and the neighbor port based upon the first number of votes and the second number of votes to provide updated data; and means for determining the likelihood of a connection between the reporting port and the neighbor port based upon the updated data.

24. The apparatus of claim 20, wherein:

the second means includes means for creating a transition table containing the data associated with the transition when a previous transition table associated with at least one of the reporting port and the neighbor port does not previously exist; and the third means includes means for analyzing the transition table.

25. The apparatus of claim 24, wherein the second means includes means for creating a transition table having locations populated with one of at least three states including a state indicative of uncertainty.

26. The apparatus of claim 20, wherein:

the second means includes means for creating a merged transition table by merging a first transition table associated with the reporting port with a second transition table associated with the neighbor port; and the third means includes means for analyzing the merged transition table.

27. The apparatus of claim 20, wherein the report includes an indication that a reporting port of the communications network has a connection to a neighbor port of the communications network.

28. The apparatus of claim 20, wherein the report includes an indication that a reporting port of the communications network has lost a connection with a neighbor port of the communications network.

29. The apparatus of claim 20, further comprising means for triggering the third means a predetermined amount of time subsequent to the second means collecting the data associated with the transition.

* * * * *